Figure 1:
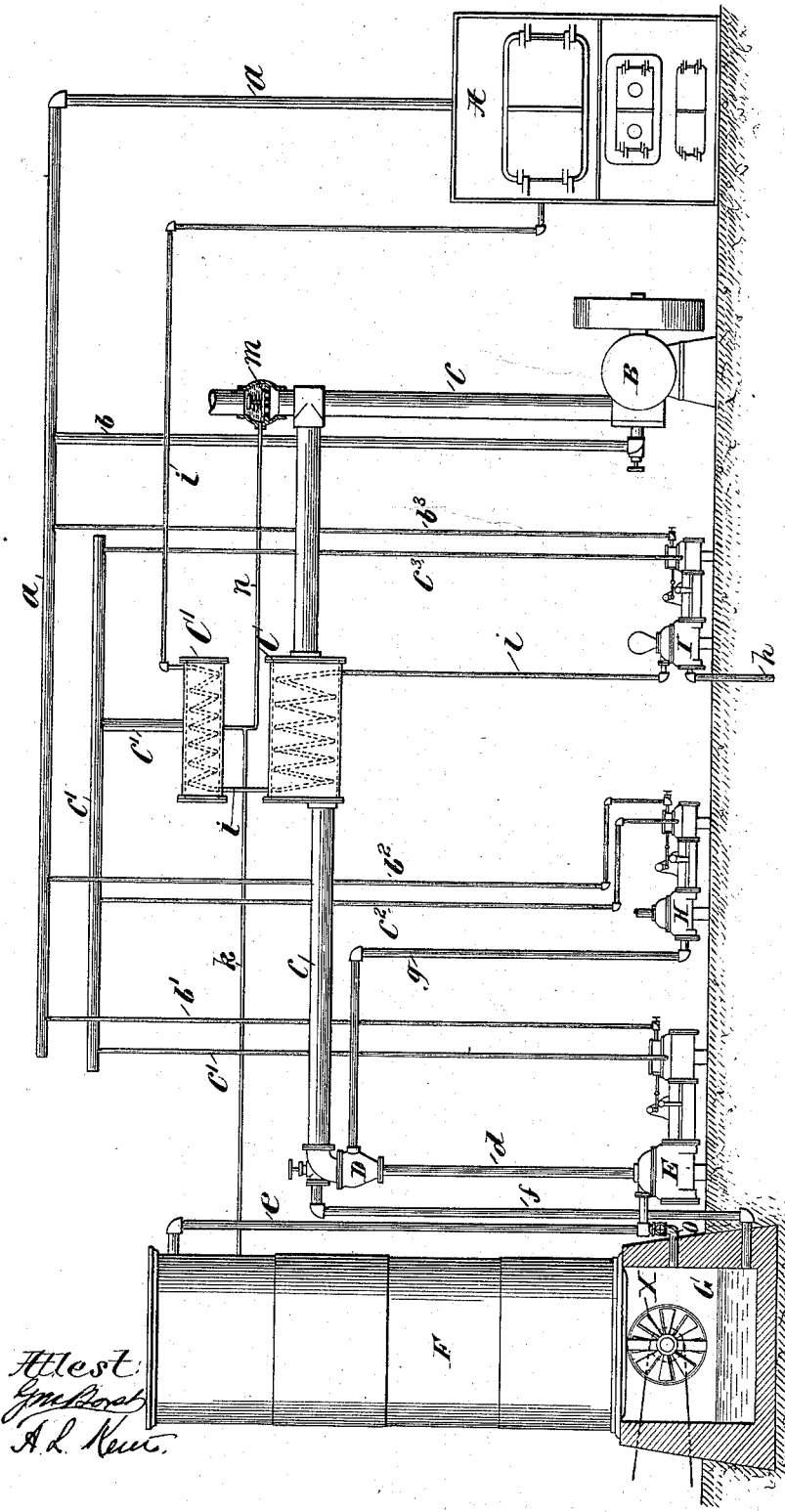

(No Model.)

L. R. ALBERGER.
CONDENSER SYSTEM.

No. 565,586. Patented Aug. 11, 1896.

2 Sheets—Sheet 1.

Attest:
Inventor.

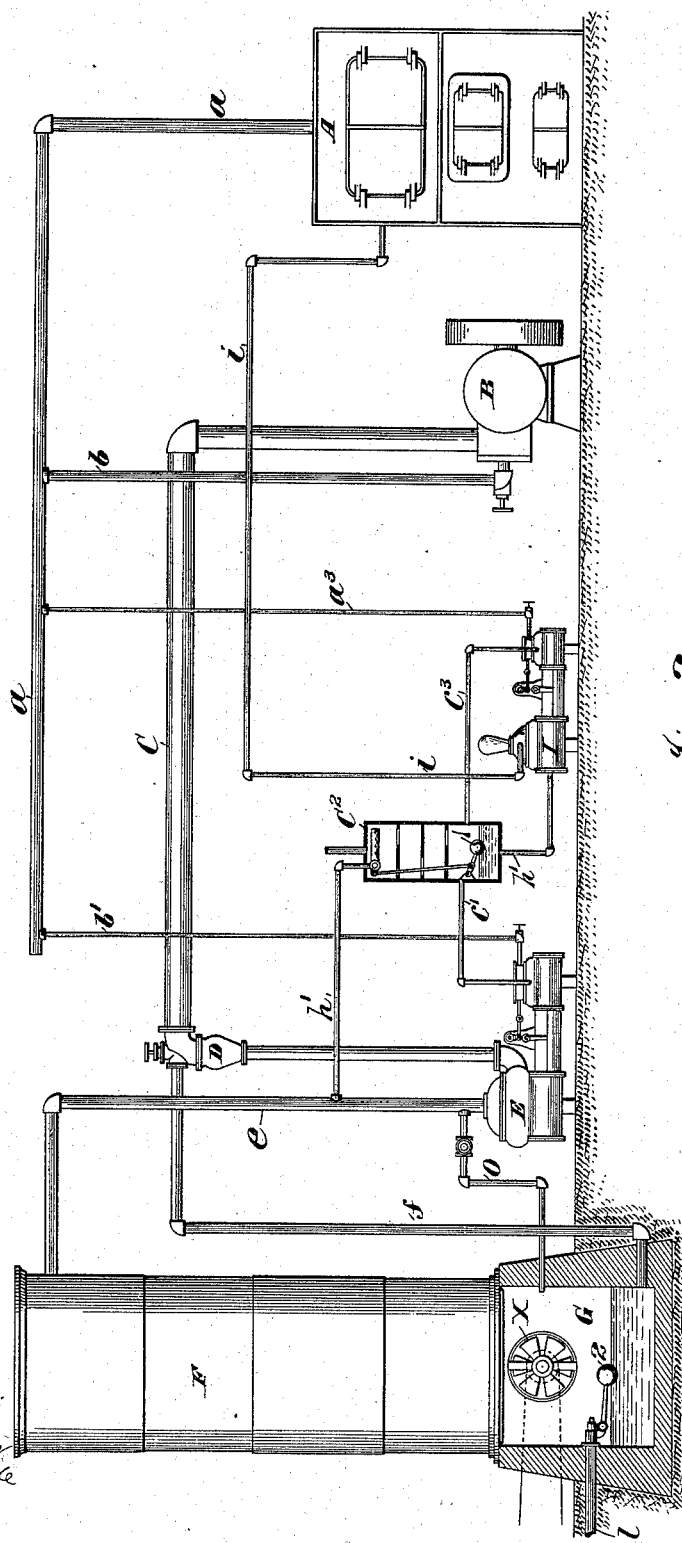

UNITED STATES PATENT OFFICE.

LOUIS R. ALBERGER, OF NEW YORK, N. Y., ASSIGNOR TO THE HENRY R. WORTHINGTON, OF ELIZABETH, NEW JERSEY.

CONDENSER SYSTEM.

SPECIFICATION forming part of Letters Patent No. 565,586, dated August 11, 1896.

Application filed May 25, 1895. Serial No. 550,642. (No model.)

*To all whom it may concern:*

Be it known that I, LOUIS R. ALBERGER, a citizen of the United States, residing at New York, county of New York, and State of New York, have invented certain new and useful Improvements in Condenser Systems, fully described and represented in the following specification and the accompanying drawings, forming a part of the same.

The especial object of the present invention is to provide an improved vacuum system of that class used in connection with large steam plants and other apparatus, and employing what is known as a "self-cooling condenser," that is, a condensing apparatus in which the liquid used for condensation is cooled and used over and over again with as little waste as possible, in order to secure the benefit of condensation without a large natural water supply. Such self-cooling condensers employ for cooling the water of condensation cooling apparatus of various forms, by which the water, while in a finely-distributed condition, is brought into contact with the air, so as to secure the desired transfer of heat to the air and consequent cooling of the water, the cooled liquid being returned to the supply-reservoir to be used again for condensation, one of the preferred forms of such apparatus consisting of a structure of considerable height, to the top of which the water is raised and through which it falls in a finely-subdivided state in contact with an upward current of air, such structures being commonly known as "cooling-towers."

The present invention provides an improved vacuum system employing a self-cooling condenser, the system being especially designed for use in connection with large steam plants, in which a high economy of operation is secured by utilizing the heat of the exhaust-steam from the auxiliary engines in addition to the heat of the exhaust-steam from the main engine or vapor from other apparatus, and employing the water condensed from the exhaust-steam of the auxiliary engines within the system, thus combining the economy of heat with the economy of water required in the system, and at the same time securing the best conditions for maintaining the vacuum desired.

This invention provides also an improved combination of aspirating condenser and pump for raising the discharge-water from said condenser, by which the condenser vacuum is utilized in raising the water from the supply, so as to assist the pump, this result being secured by elevating the condenser above the water supply and pump as required for this purpose, an air-pump preferably being connected with the condenser, so as to secure and maintain a high degree of vacuum without using a large condenser and large and rapid current or flow of water. This construction may be used in steam plants of any form, wherever it is desired to reduce the work of the pump by which the discharge-water from the aspirating condenser is delivered, but it is especially applicable in self-cooling condensers employing a cooling-tower and a pump for raising the discharge-water.

The invention may be applied in connection with condensing systems of different forms and with steam plants used for different purposes, and the heat from the exhaust steam or vapor may be utilized for different purposes and the water condensed from the exhaust steam or vapor may be added either to the water used for condensation or go to the boiler as feed-water; but, for a full understanding of the invention, a detailed description of constructions embodying the same in its preferred forms as applied in connection with a steam-engine plant, and the utilization of the heat of the exhaust-steam for heating the feed-water, certain features of which plants form specific parts of the invention, will now be given in connection with the accompanying drawings, forming a part of this specification, and the features forming the invention will then be specifically pointed out in the claims.

In the drawings, Figure 1 shows in diagram a steam plant of simple form in which the water from the exhaust-steam of the auxiliary engines goes to the water used for circulation and condensation; and Fig. 2 is a similar view of a plant in which the water condensed from the exhaust-steam of the auxiliary engines is returned to the boiler.

Referring to Fig. 1, A is the steam-boiler, and B the main engine, receiving steam from the boiler through the main steam-pipe $a$ and branch pipe $b$, the engine exhausting through the exhaust-pipe $c$ and the main heater C to the injector-condenser D, which may be of any suitable form, the form shown being that of United States Letters Patent No. 227,342, the water used for condensation and the water condensed from the exhaust-steam then passing through the pipe $d$ to the pump E and being raised thereby through pipe $e$ to the top of the cooling-tower F, which may be of any suitable construction, and the cooled water being received into tank G at the foot of the tower, from which the pipe $f$ for the water for condensation passes to the top of the condenser D, a fan being shown for supplying a current of air through the tower. The condenser D, pump E, tower F, and connections thus form a self-cooling condenser. This self-cooling condenser is arranged so that the vacuum in the condenser does a part of the work of raising the water of condensation from the supply G to the top of the tower F, thus relieving the condenser-pump E of so much of the work, this result being secured by elevating the condenser D above the pump E and water supply G, so as to utilize the vacuum in the condenser to lift the water from the tank G, and making the condenser D and pipe $d$ of such form and relative size as to cause the discharge-water to flow to the pump E through pipe $d$ under the head due to the column of water in the pipe, thus assisting the pump. By this means it will be found that, with the proper form of pump and condenser, the work of the pump may be reduced very largely. This result is also aided and the amount of water required for the condenser reduced, while the securing of the vacuum desired is assured, by the use of an air-pump H, connected with the condenser by pipe $g$, this pump acting to withdraw from the condenser D uncondensable vapors and the air brought in with the water of condensation and exhaust-steam and not carried out by the water, and this pump may form another auxiliary engine of the plant. The injector-condenser shown, and other forms of injector, ejector, siphon, or induction-condensers, to which may be applied the general term of "aspirating condensers," will operate to carry off with the water a large part of the air, and it will be understood that fairly good results may be secured with such condensers without the air-pump; but, especially in plants of considerable size, the air-pump is preferably employed with such condensers and important results are secured thereby. Thus the amount of water required is reduced to only that necessary for condensation even under light loads, as the current or flow of water need not be so large and rapid as that required to carry off the air without the air-pump, even sufficiently for small and most carefully-constructed plants. The air-pump is not required to remove all the air, but only that not removed with the water by the aspirating condenser, so that its work is light.

The steam supply for the condenser-pump E is received from the boiler A through the branch steam-pipe $b'$, and this pump exhausts through the exhaust-pipe $c'$ to the supplementary heater C'. The steam supply for the air-pump H is received from the boiler A through the branch steam-pipe $b^2$, and this pump exhausts through the exhaust-pipes $c^2$ $c'$ to the supplementary heater C'. The boiler feed-pump I, which forms another auxiliary engine of the system, receives its steam supply through the branch pipe $b^3$ and exhausts through the pipe $c^3$ into pipe $c'$ and thus into the supplementary heater C'. The feed-water is received from the feed-water supply through the pipe $h$ and delivered by the pipe $i$ through the main heater C and supplementary heater C' to the boiler A, the interior arrangement of the main and supplementary heaters C and C' being of any common or suitable form to secure the proper heating of the feed-water, the heat of the exhaust-steam of the three auxiliary engines E H I thus being applied for this purpose. The water condensed from the exhaust-steam from the cylinders of these three auxiliary engines in the supplementary heater C' is conducted through a drip-pipe $k$ to the water used for condensation, entering the condensation or circulating system at any suitable point, but preferably at as high a level in the tower F as convenient, so as to be cooled therein. The pipe $o$ is a waste-pipe used in starting the pump E. The engines of the pumps E H I thus form the auxiliary engines of the steam plant, the exhaust-steam from which is utilized for heating and the water condensed from the steam utilized as a part of the water supply for condensation and circulation. The loss of heat and water is thus reduced to a minimum, the only loss of water being that evaporated from the cooling-tower and its equivalent quantity being restored by the water condensed from the exhaust-steam, so that the only outside water supply required is that for the boiler feed-water. There is an advantage in using the water condensed from the exhaust-steam for condensation-water instead of for boiler feed-water, as this makes it possible without loss of economy to use for the boiler only clean water free from grease and lubricants.

In the system shown the atmospheric relief-valve, which is preferably employed, is sealed by water from within the system, and this feature forms a part of the invention. In systems previously in use this relief-valve is sealed by water from an outside source, involving expense for water and requiring constant watching to prevent leakage of air unless the sealing-water runs constantly or is automatically controlled, as by a float-valve. I provide a construction by which this relief-valve is constantly sealed by water from within and which returns to the system, and the control is complete and automatic without special valves or controlling devices for this purpose. This result is secured in the special apparatus shown by placing the relief-valve m on the pipe c at a point just below the level of the horizontal portion of the pipe k from the supplementary heater and running a pipe n from this pipe k to the relief-valve m, so that the latter will be kept submerged to the level of the pipe k and sufficiently for sealing. It will be understood that this pipe n may connect directly with the heater C' or with any other part of the system from which water may conveniently be drawn for sealing. It will be seen that the automatic control thus secured is complete, the sealing-water being kept at the proper level while the engine is running and the stopping of the engine cutting off the supply of water to the valve, so that the exhaust-pipe will not fill up when the engine is stopped. All the sealing-water leaking past the valve is added to the condensation-water, so that there is no loss from this cause.

While, as above stated, it is preferable that the water condensed from the exhaust-steam should be used for condensation-water, instead of for boiler feed-water, a construction involving the latter use of this water may be employed. In Fig. 2 is shown such a system in which an open feed-water heater C³ is used, the two auxiliary engines E I exhausting into this and the feed-water being received thereby through the pipe h' from the pipe e, leading from the condenser-pump E to the top of the cooling-tower F, this pipe being shown as controlled by a valve and float 1, which may be of any suitable construction, such as is commonly used for this purpose. In this construction it will be seen that the heat of the exhaust-steam from the main engine B goes to the water for condensation and the boiler supply is drawn from the latter after the steam is condensed thereby, while the exhaust-steam from the auxiliary engines E I is utilized for heating the feed-water directly in the heater C². All the water condensed from the exhaust-steam is thus retained within the system, that condensed from the steam of the main engine B going to the water of condensation, and that from the exhaust-steam of the auxiliary engines being returned to the boiler. The supply of feed-water or a portion may be received directly from an outside source, as in the construction previously described, but the construction shown is preferred, so that only one outside supply is required—viz., that to maintain a supply in the tank G—an inlet-pipe l, controlled by a float 2 in the tank G, being shown for this purpose.

It will be understood that the invention may be used in connection with steam plants employed for other purposes than driving a steam-engine, that the heat of the exhaust-steam may be used for heating purposes other than heating the feed-water, and that the number of auxiliary engines, the exhaust from which is used for heating and having the water condensed from their exhaust-steam employed within the system, will be varied in accordance with the character of the steam plant in connection with which the invention is applied. It is obviously not necessary in the construction shown in Fig. 1 that the exhaust-steam should be fully condensed in the supplementary heater or even that two heaters should be used, although the latter construction is desirable. Thus the exhaust-steam from the auxiliary engine may be delivered to and its heat utilized in the main heater or it may be partially condensed in the supplementary heater and then delivered through a suitable valve directly to the condenser or to the main heater. It is also obvious that, in the construction shown in Fig. 1, if the condensation-water be increased by the water from the condensed steam to an amount greater than that necessary for circulation, such surplus may be run to waste, or it may be utilized as boiler feed-water, thus giving still further economy. It will be understood that the word "steam" in the claims is used for convenience and is to be construed as including any other condensable vapor.

What is claimed is—

1. In a vacuum steam system employing one or more auxiliary engines, the combination with a self-cooling condenser having a cooling-tower, a pump for raising the water to be cooled and an aspirating condenser elevated above the water supply and pump to utilize the condenser-vacuum in raising the water, whereby the water passes from the condenser to the pump under a head and the pump is thus assisted, of means for utilizing heat from the exhaust-steam of the auxiliary engine or engines and utilizing the water condensed from the exhaust-steam of the auxiliary engine or engines within the vacuum system, substantially as described.

2. In a vacuum steam system employing one or more auxiliary engines, the combination with a self-cooling condenser having a cooling-tower, a pump for raising the water to be cooled and an aspirating condenser elevated above the water supply and pump to utilize the condenser-vacuum in raising the water, whereby the water passes from the condenser to the pump under a head and the pump is thus assisted, of means for utilizing heat from the exhaust-steam of the auxiliary engine or engines and utilizing the water condensed from the exhaust-steam of the auxiliary engine or engines within the vacuum system, and an air-pump connected with said aspirating condenser, substantially as described.

3. In a self-cooling condenser, the combination with a cooling-tower and a pump for raising the water to be cooled, of an aspirating condenser connected with the pump and elevated above the water supply and pump to utilize the condenser-vacuum in raising the water, whereby the water passes from the condenser to the pump under a head and the pump is thus assisted, substantially as described.

4. In a self-cooling condenser, the combination with a cooling-tower and a pump for raising the water to be cooled, of an aspirating condenser connected with the pump and elevated above the water supply and pump to utilize the condenser-vacuum in raising the water, whereby the water passes from the condenser to the pump under a head and the pump is thus assisted, and an air-pump connected with said aspirating condenser, substantially as described.

5. The combination with an aspirating condenser and water supply, of a pump for raising the discharge-water from said condenser, said condenser being elevated above the water supply and pump to utilize the condenser-vacuum in raising the water from the supply, whereby the discharge-water passes from the condenser to the pump under a head and the pump is assisted, substantially as described.

6. The combination with an aspirating condenser and water supply, of a pump for raising the discharge-water from said condenser, said condenser being elevated above the water supply and pump to utilize the condenser-vacuum in raising the water from the supply, whereby the discharge-water passes from the condenser to the pump under a head and the pump is assisted, and an air-pump connected with said condenser, substantially as described.

In testimony whereof I have hereunto set my hand in the presence of two subscribing witnesses.

LOUIS R. ALBERGER.

Witnesses:
FRED. A. JONES, Jr.,
B. W. PIERSON.